US 6,542,517 B1

(12) United States Patent
Giacalone

(10) Patent No.: US 6,542,517 B1
(45) Date of Patent: Apr. 1, 2003

(54) SYSTEM AND METHOD FOR OPERATING A MOBILE STATION IN VOICE MODE OR PAGER MODE

(75) Inventor: Joseph Giacalone, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 0 days.

(21) Appl. No.: 09/309,336

(22) Filed: May 11, 1999

(51) Int. Cl.⁷ .............................. H04J 3/16; H04Q 7/20; H04B 1/38
(52) U.S. Cl. ........................ 370/465; 455/553; 455/434
(58) Field of Search ................... 370/318, 320, 370/323, 335, 342, 347, 357, 358, 465, 468, 538, 543, 542; 455/422, 515, 434, 442, 458, 426, 466, 343, 553, 574, 460, 556, 557, 564

(56) References Cited

U.S. PATENT DOCUMENTS

| | | | |
|---|---|---|---|
| 5,148,473 A | * | 9/1992 | Freeland et al. ............ 455/556 |
| 5,526,398 A | * | 6/1996 | Okada et al. ................ 455/426 |
| 5,604,744 A | * | 2/1997 | Anderson et al. ............ 370/347 |
| 5,842,141 A | * | 11/1998 | Vaihoja et al. .............. 455/574 |
| 6,216,004 B1 | * | 4/2001 | Tiedemann, Jr. et al. ... 455/458 |

* cited by examiner

*Primary Examiner*—Steven Nguyen
*Assistant Examiner*—Phuongchau Ba Nguyen
(74) *Attorney, Agent, or Firm*—Philip Wadsworth; Charles Brown; Howard Seo

(57) ABSTRACT

A system and method for operating a mobile station in two modes, voice mode and page mode. A mobile station and a base station are provided. The mobile station is capable of operating in a first mode suitable for receiving telephone calls and in which the mobile station scans portions of a channel at a first rate. The mobile station is capable of operating in a second mode suitable for receiving pages only and in which the mobile station scans portions of the channel at a second rate. The first rate is higher than the second rate and the mobile station is capable of switching between the two modes at the option of the user thereof.

13 Claims, 5 Drawing Sheets

SYSTEM AND METHOD FOR OPERATING A MOBILE STATION IN VOICE MODE OR PAGER MODE

BACKGROUND OF THE INVENTION

I. Field of the Invention

The present invention relates generally to the operation of mobile stations. More particularly, the present invention relates to the operation of mobile stations in voice or pager mode.

II. Description of the Prior Art

The limited duration of time during which a prior art mobile station may be operated without exhausting its power supply is a factor that limits the use of mobile stations by consumers. Leaving a prior art mobile station on in order to receive calls swiftly exhausts power even if no calls are made or received. This factor influences many mobile station subscribers to utilize their mobile stations only for placing calls to others. Other subscribers utilize their mobile stations only during limited periods of time. The result is the frustration of subscribers desiring to use their mobile stations to their fullest potential and loss of potential revenues to carriers unable to supply additional service to such subscribers. Although increasing the power of a mobile station battery is feasible to a degree, doing so tends to require an increase in the size and weight of the battery, detracting from the mobile nature of the mobile station.

It is therefore an object of the present invention to provide a method and system for operating a mobile station so as to maximize the period of time during which a mobile station may be operated without recharging or changing its battery while still allowing a subscriber to receive notification of telephone calls placed to the mobile station.

SUMMARY OF THE INVENTION

A system and method for operating a mobile station (e.g. a cellular telephone) in two modes. A mobile station and a base station are provided. The mobile station is capable of operating in a first mode suitable for receiving telephone calls and in which said mobile station scans portions of a channel at a first rate or in a second mode suitable for receiving pages only and in which said mobile station scans portions of the channel at a second rate. The first rate is higher than the second rate. The mobile station is capable of switching between the two modes at the option of the user thereof.

BRIEF DESCRIPTION OF THE DRAWINGS

The features, objects, and advantages of the present invention will become more apparent from the detailed description set forth below when taken in conjunction with the drawings in which like reference characters identify corresponding elements and wherein.

DETAILED DESCRIPTION OF THE PREFERRED EMBODIMENTS

The following definitions are provided to aid in understanding the claims of the present application:

Page mode. A mobile station that is operating in page mode does not receive telephone calls placed to it as telephone calls, but rather as pages. In other words, in this mode the mobile station receives pages that carry information corresponding to calls placed to the mobile station (such as the caller's telephone number and the time of the call) rather than the calls themselves.

Voice mode. The normal mode of operation of a mobile station. In voice mode, the mobile station receives telephone calls as telephone calls. Certain mobile stations are capable of receiving both telephone calls and pages. In voice mode, a telephone call will only be converted to a page if the mobile station is unable to receive the telephone call because, for example, the mobile station is busy with another call. Voice mode does not in any way restrict these capabilities. However, telephone calls placed to the mobile station will not automatically be converted to pages.

Figure 1A:
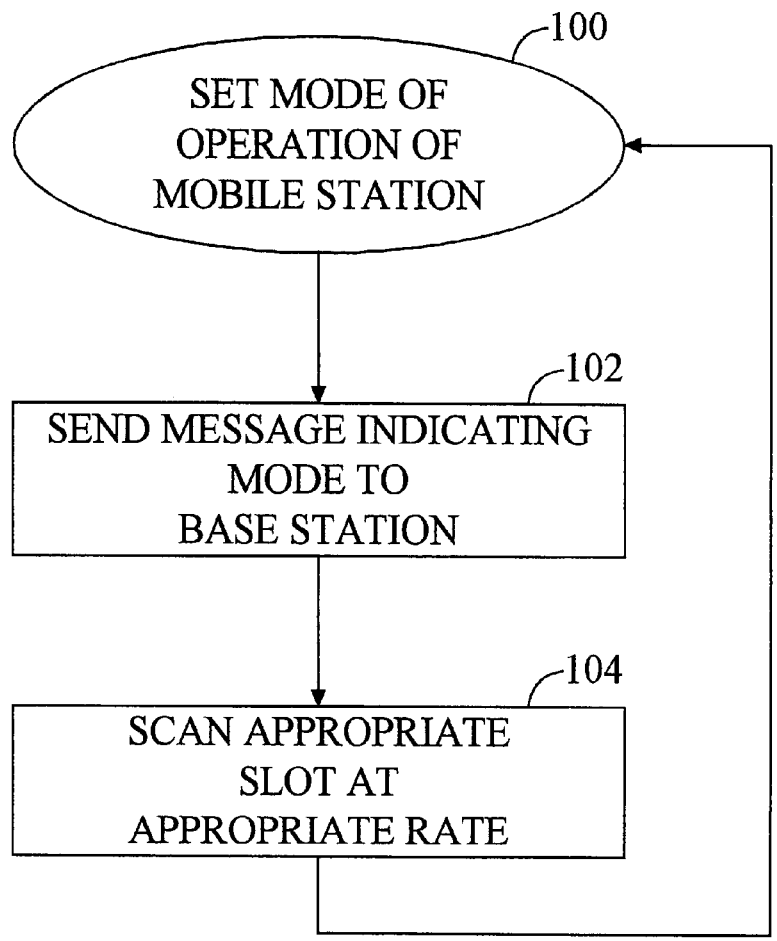
FIG. 1A is a flow diagram showing the operation of a preferred embodiment of the present invention.

Referring to FIG. 1A, in a preferred embodiment, a subscriber sets the mode of his mobile station to either voice or page in step 100. Preferably, the mode may be set by pressing a function key or a short sequence of keystrokes on the mobile station. Also, a display on the mobile station preferably shows an indicator to remind the subscriber of the current mode. In page mode, the mobile station functions as if it were a pager, displaying messages when calls are received. Such messages may include any or all of the telephone number of the caller, the name of the caller (in embodiments incorporating caller identification), the time of the call, and a message entered by the caller, as well as other data. In voice mode, the mobile station functions as an ordinary telephone. Typically, the user will set the mode to page when he wishes to conserve the mobile station's battery power without losing the ability to be notified of telephone calls to his number. Upon receipt of a page, he can switch to voice mode to return the telephone call and switch back to page mode upon the conclusion of the telephone call to continue to conserve battery power. In a second embodiment of the present invention, the mobile station automatically places itself in page mode at the conclusion of each telephone call, or optionally places itself in page mode a predetermined number of minutes after the conclusion of each call if the subscriber does not enter an override code to keep it in voice mode.

In step 102, the mobile station transmits a message to the base station indicating the mode that it is in. This is necessary because, as explained below, the paging slot of the paging channel monitored by the mobile station depends on the mode in which the mobile station is operating. In one embodiment, the paging channel monitored by the mobile station conforms to the specifications of the paging channel set forth in the IS95A standard incorporated herein by reference. The paging channel, which represents a portion of the bandwidth allocated to a carrier, is used to transmit to the mobile station a notification from the base station that a telephone call (or page) is being sent to it. The paging channel is in turn divided into slots of time, which recur at different intervals. A frequently recurring slot must be allocated for notification of a telephone call because any delay that is not extremely brief is noticeable to a party placing a call to the subscriber. On the other hand, a delay of even several minutes is acceptable in page mode due to the asynchronous nature of pages. Thus, the base station must be notified of the paging slot being used so that it may send data intended for the mobile station in the appropriate paging slot. Moreover, if information is being transmitted to the mobile station by more than one base station, such as during a handoff of a mobile station call from one base station to another, each base station must receive notification of the mobile station's current mode.

Finally, in step 104, the mobile station scans the appropriate slot for notification of incoming calls or pages. When in voice mode, the mobile station then proceeds to process each incoming call as an ordinary mobile station, as described below in connection with FIGS. 3 and 4. When in page mode, the mobile station processes each incoming call as an ordinary pager. The process repeats for each incoming call or page until the mode is changed again in step 100.

Figure 1B:
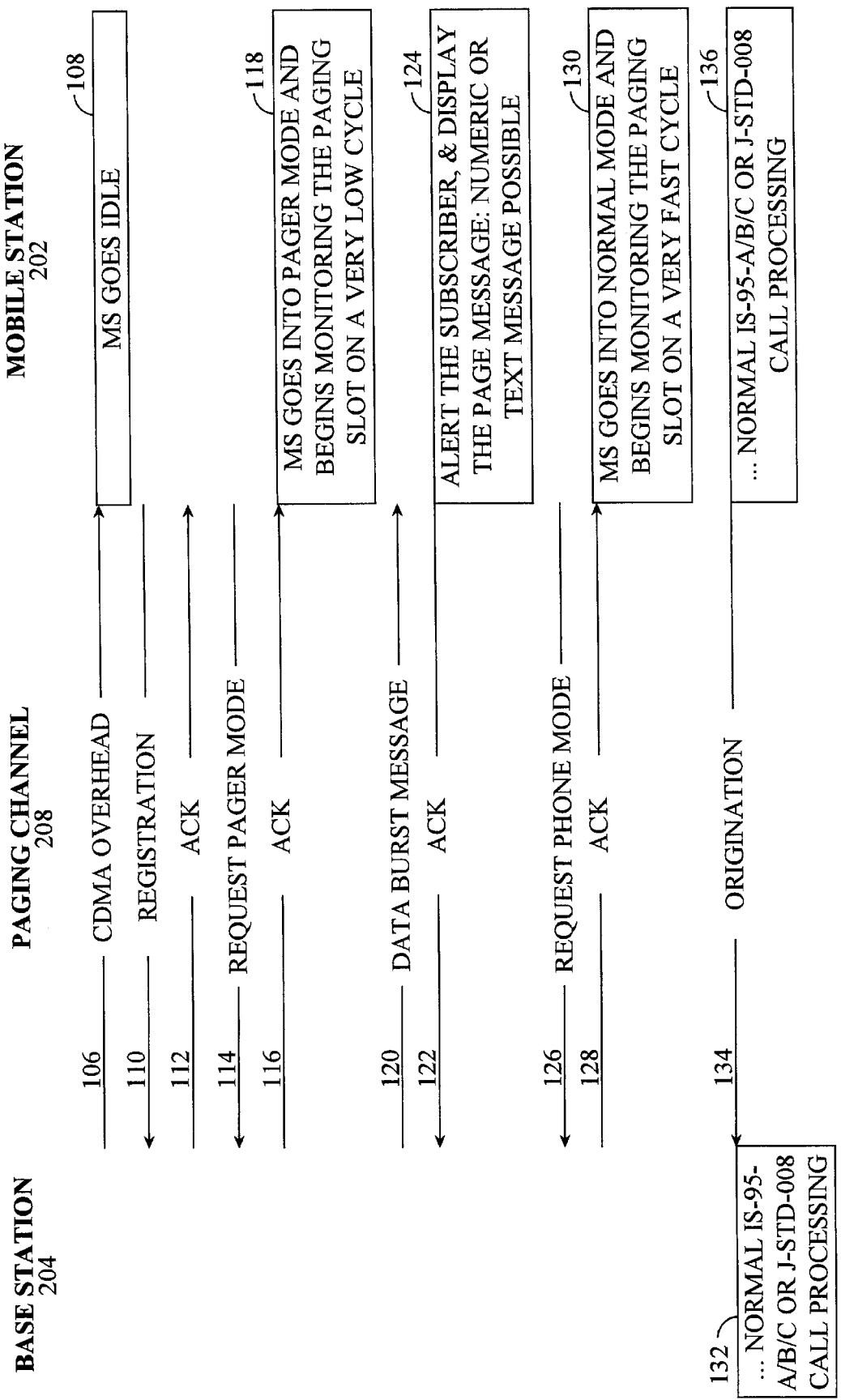
FIG. 1B is a flow diagram showing the operation of a further preferred embodiment of the present invention.

Referring to FIG. 1B, the messages that are transmitted in a particularly preferred embodiment of the present invention in connection with changes of mode from voice to page and back to voice are illustrated. Mobile station 202 and base station 204 exchange messages over paging channel 208. The base station constantly transmits CDMA overhead messages 106 intended for all mobile stations in the area. At some point, the mobile station goes idle, either because the user chooses to enter page mode or because the system automatically attempts to enter page mode. The mobile station then transmits registration message 110 to the base station to inform the base station that the mobile station is within the vicinity of the base station. The base station replies by sending acknowledgement message 112, confirming the existence of two-way communications between the base station and the mobile station. The mobile station then transmits request page mode message 114, to which the base station replies with acknowledgement message 116. At this point 118, the mobile station enters page mode.

Subsequently, as a result of the placement of a telephone call to the mobile station's assigned telephone number, data burst message 120 is sent from the base station to the mobile station. The data burst message may include the caller's telephone number, and possibly other information as well. At this point 124, the user of the mobile station is informed of the incoming call and a message is displayed on the display of the mobile station. The mobile station then sends acknowledgement message 122 to the base station. The mobile station may be returned to voice mode either by choice or automatically by the system. First, the mobile station sends request telephone mode message 126 to the base station. The base station then replies with acknowledgement message 128, which allows reception and origination of voice calls from the mobile station to recommence.

Table 1 illustrates a variable length data format for a voice or page mode change request in a preferred embodiment of the present invention. The activate field indicates whether the mobile station will be entering voice or page mode. Moreover, by placing an appropriate value in the slot cycle index, the mobile station may indicate to the base station how frequently it will monitor the paging channel. In this embodiment, the value may range from 1, indicating that the paging channel will be monitored once every 1.28 seconds to 128, indicating that the paging channel will be monitored once every 1.28*128 seconds, or once every 163.84 seconds. In this embodiment, the value used when the mobile station is in voice mode will be 1, representing monitoring the paging channel every 1.28 seconds and the value used when the mobile station is in page mode will be 128, representing monitoring the paging channel once every 163.84 seconds. In other embodiments, the paging channel will be typically be monitored at least once every six seconds when in voice mode and between once every six seconds and once every 3600 seconds when in page mode.

TABLE 1

| Field | Length (bits) |
| --- | --- |
| MSG TYPE | 8 |
| ACK SEQ | 3 |
| MSG SEQ | 3 |
| ACK REQ | 1 |
| VALID ACK | 1 |
| ACK TYPE | 3 |
| MSID LEN | 4 |
| MSID | 8 * MSID LEN |
| ACTIVATE (on or off bit) | 1 |
| SLOT CYCLE INDEX | 8 |
| OTHER NEEDED CDMA LAYER III MSG | Variable |

Figure 2:
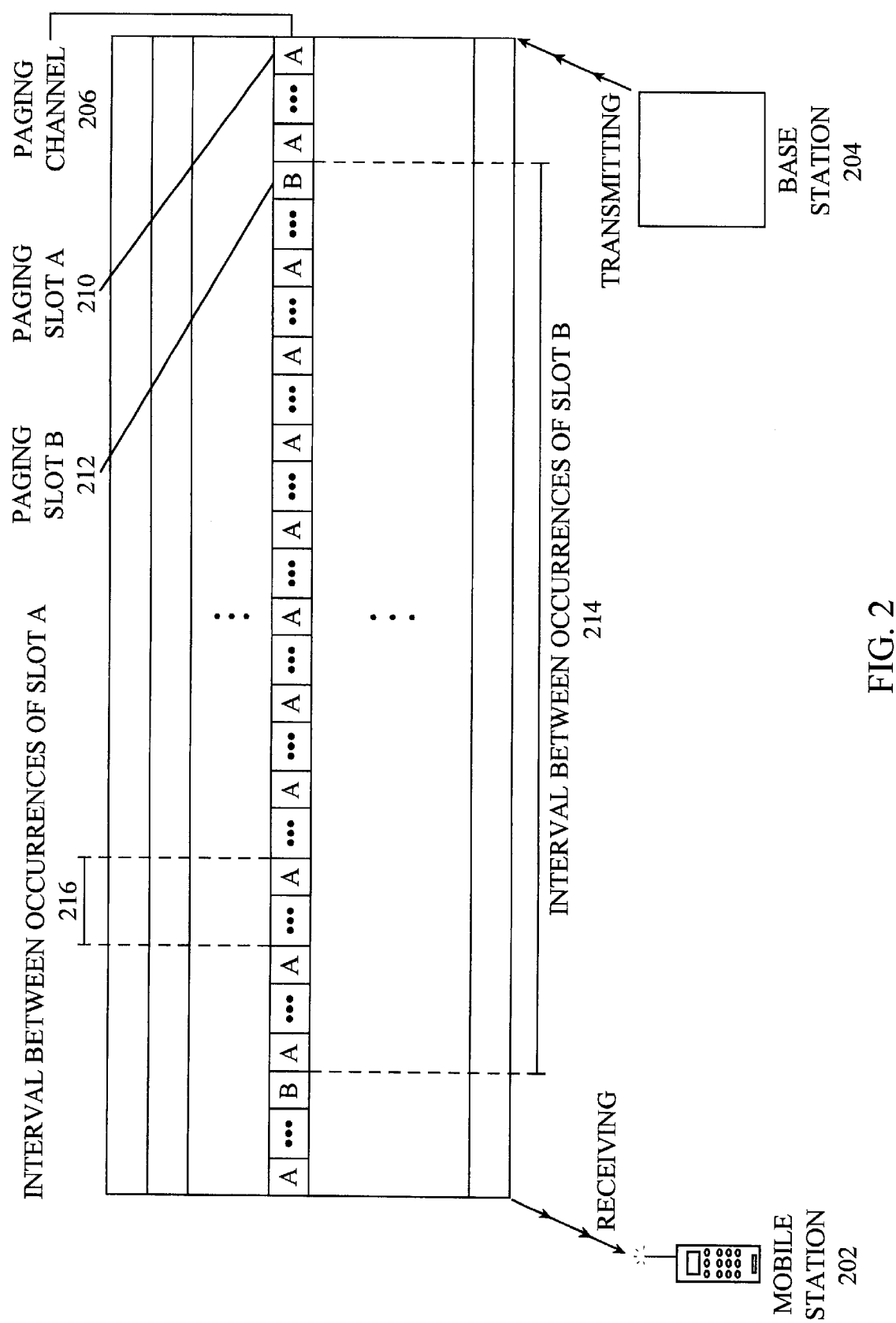
FIG. 2 is a block diagram showing a preferred embodiment of the present invention.

Turning to FIG. 2, a mobile station 202 receives broadcast transmissions from base station 204. Only one base station is shown, but it will be understood by those skilled in the art, that the mobile station may receive signals from more than one base station depending on factors not here relevant, such as the relative signal strengths of signals received from a plurality of base stations. One channel within that portion of the spectrum allocated to the carrier is designated as a paging channel 208. Channel 208 is divided into slots of time of preferably even duration but differing rates of recurrence. Slot A 210 recurs relatively frequently and is hence suitable for use by the mobile station when in voice mode, while slot B 212 recurs relatively infrequently, rendering it suitable for use by the mobile station when in page mode. The intervals between occurrences of slots A and B are shown by elements 216 and 214 respectively. Further details concerning paging slots are described in U.S. Pat. No. 5,544,223 entitled "Method and Apparatus for Paging a Concentrated Subscriber System for Wireless Local Loop", which is assigned to the assignee of the present invention and incorporated herein by reference.

The content of the broadcast transmissions to the mobile station depends on the mode in which the mobile station is currently functioning. Base station 204 stores the current mode in a table upon receipt of notification of the current mode in step 102, as described above. If a telephone call is placed to a mobile station in voice mode, the base station sends a notification of the placement of the call to the mobile station by broadcasting an encoded message in the appropriate (frequently recurring) paging slot A of the paging channel, as described above. This encoded message includes a code indicating that a telephone call is being placed. A data channel is subsequently opened for transmission of voice data. If, on the other hand, a telephone call is placed to a mobile station in page mode, the base station sends a notification of the placement of the call to the mobile station by broadcasting an encoded message in the appropriate (less frequently recurring) paging slot of the paging channel B, as described above. This encoded message includes a code indicating that a page is being placed. A data channel is subsequently opened for transmission of page data, such as the telephone number of the party placing the call in a convenient data format (such as ASCII). The system optionally further provides appropriate signals to the telephone from which the call is being placed so that the caller receives standard tones and prompts relating to pages. Alternatively, the system further provides appropriate signals to the telephone from which the call is being placed so that the caller receives standard tones indicating that the called party is not answering the call and a message informing the caller that corresponding page information has been sent to the intended recipient mobile station.

Figure 3:
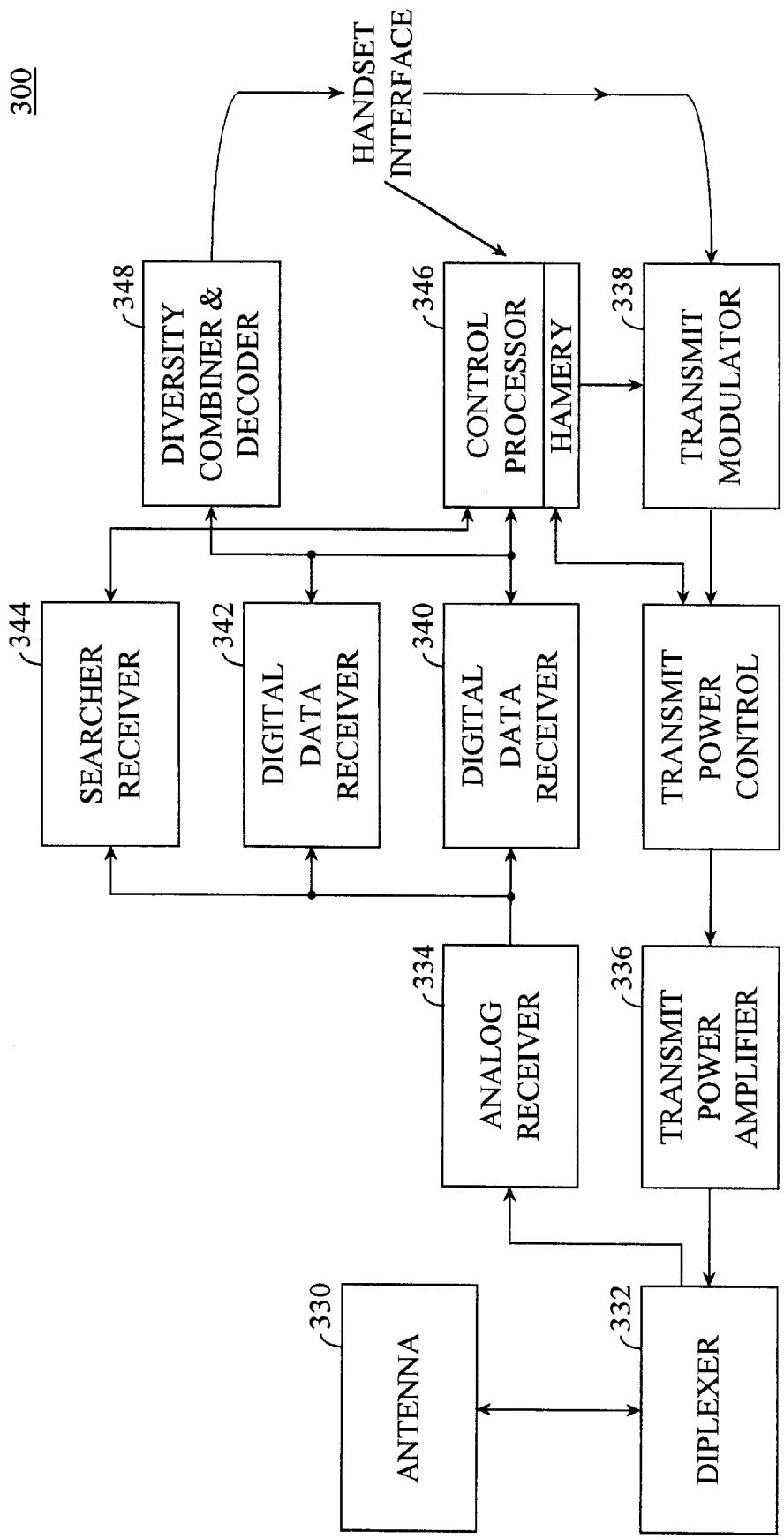
FIG. 3 is a block diagram of a mobile station in accordance with a preferred embodiment of the present invention.

Referring now to FIG. 3, the components of an exemplary code division multiple access [hereinafter "CDMA"] mobile station 300 used for implementing the invention shown in FIGS. 1 and 2 are illustrated. The mobile station includes an antenna system 330, which is coupled through diplexer 332 to analog receiver 334 and transmit power amplifier 336. Antenna system 330 and diplexer 332 are of standard design and permit simultaneous reception and transmission through one or more antennae. Antenna system 330 collects signals transmitted to the mobile station from one or more base stations and provides the signals through diplexer 332 to analog receiver 334. Receiver 334 is also provided with an analog to digital converter (not shown). Receiver 334 receives radio frequency signals from diplexer 332, amplifies and frequency downconverts the signals, and provides a digitized output signal to digital data receivers 340 and 342 and to search receiver 344. It will be understood that, although in the embodiment in FIG. 3 only two digital data receivers are shown, a low performance mobile station might have only a single digital data receiver while higher performance units will have two or more digital data receivers to permit diversity reception. The outputs of receivers 340 and 342 are provided to diversity combiner and decoder circuitry 348, which time adjusts the two streams of data received from the receivers 340 and 342, adds the streams together, and decodes the result. Such decoding includes conversion of voice data into a suitable format for the generation of appropriate sound waves through the mobile station's speaker and the conversion of page data into a suitable format for display on a numeric or alphanumeric display on the mobile station. The receiver circuitry, namely analog receiver 334, digital data receivers 340 and 342, searcher receiver 344, and diversity combiner and decoder 348, only process signals received either during the appropriate paging slot (depending on the current mode of the mobile station) or after notification of receipt of a call or page (and prior to termination of such call or page). Details concerning the operation of digital data receivers 340 and 342, search receiver 344, and diversity combination and decoder circuitry 348 are described in U.S. Pat. No. 5,101,501 entitled "Method and Apparatus for Providing a Soft Handoff in Communications in a CDMA Cellular Telephone System", which is assigned to the assignee of the present invention and incorporated herein by reference. The system of FIGS. 1 and 2 is preferably implemented in software on control processor 346, which regulates the use of the receiver circuitry depending on the mode of operation so as to minimize power consumption when the mobile station is operating in page mode.

Figure 4:
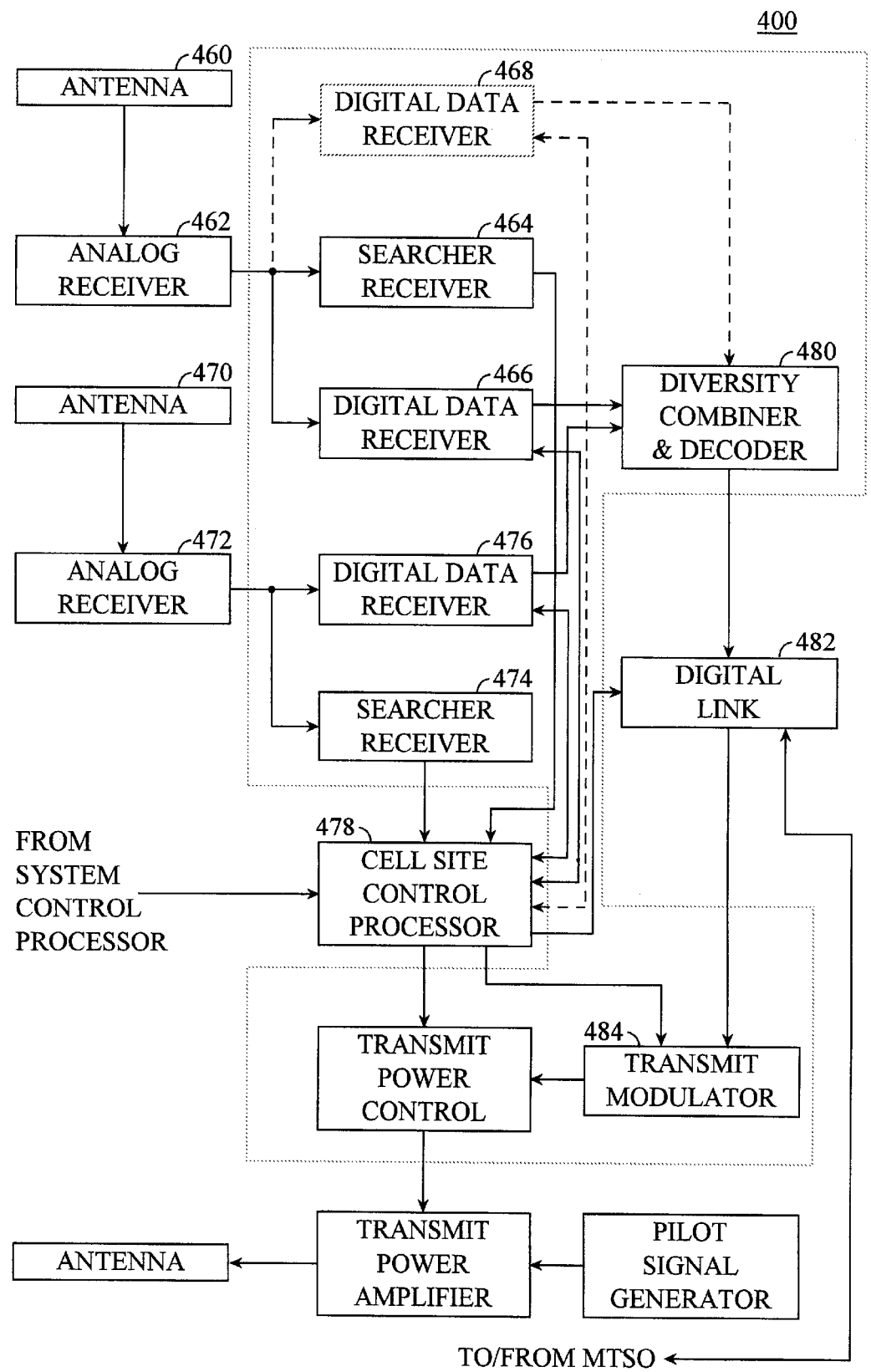
FIG. 4 is a block diagram of a base station in accordance with a preferred embodiment of the present invention.

Referring now to FIG. 4, there is shown a block diagram of the components of an exemplary CDMA base station 400 used for implementing the present invention. At the base station, two receiver systems are utilized, with each having a separate antenna and analog receiver for diversity reception. In each of the receiver systems, the signals are processed identically until the signals undergo a diversity combination process. The elements within the dashed lines correspond to elements corresponding to the communications between the base station and one mobile station. Referring still to FIG. 4, the first receiver system is comprised of antenna 460, analog receiver 462, searcher receiver 464, and digital data receivers 466 and 468. The second receiver system includes antenna 470, analog receiver 472, searcher receiver 474, and digital data receiver 476. Cell site control processor 478 is used for signal processing and control. Among other things, cell site processor 478 monitors the signals received from a mobile station for indications of mode changes necessitating changes in paging slots utilized in signals transmitted from the base station and regulates transmit modulator 484 so that transmit modulator 484 transmits data intended for each particular mobile station within its assigned paging slot depending on the current mode of operation of the mobile station.

Both receiver systems are coupled to diversity combiner and decoder circuitry 480. A digital link 482 is used to communicate signals from and to a base station controller or data router under the control of control processor 478. Signals received on antenna 460 are provided to analog receiver 462, where the signals are amplified, frequency translated, and digitized in a process identical to that described in connection with the mobile station analog receiver. The output from the analog receiver 462 is provided to digital data receivers 466 and 468 and searcher receiver 464. The second receiver system (i.e., analog receiver 472, searcher receiver 474, and digital data receiver 476) processes the received signals in a manner similar to the manner in which the signals are processed by the first receiver system. The outputs of digital data receivers 466 and 476 are provided to diversity combiner and decoder circuitry 480, which processes the signals in accordance with a decoding algorithm. Details concerning the operation of the first and second receiver systems and the diversity combiner and decoder 480 are described in U.S. Pat. No. 5,101,501 entitled "Method and Apparatus for Providing a Soft Handoff in Communications in a CDMA Cellular Telephone System", incorporated by reference above. Signals for transmission to mobile units are provided to transmit modulator 484 under the control of processor 478. Transmit modulator 484 modulates the data for transmission to the intended recipient mobile station.

Although the present invention has been described in connection with mobile radio communication systems that use CDMA modulation for transmitting signals between the mobile station and the base stations in the system, it will be understood by those skilled in the art that the teachings of the present invention could be applied in mobile radio communications that use other modulation methods, such as time division multiple access modulation, for communicating between the mobile station and base stations in the system.

The previous description of the preferred embodiments is provided to enable any person skilled in the art to make or use the present invention. In addition, various modifications to the embodiments described above will be readily apparent to those skilled in the art, and the generic principles defined herein may be applied to other embodiments without the use of inventive faculty. Thus, the present invention is not intended to be limited to the methods and apparatuses shown herein but is to be accorded the widest scope consistent with the claims set forth below.

What is claimed is:

1. A system for operating a mobile station in two modes, comprising:

a mobile station; and a base station, wherein said mobile station is capable of operating in a first mode suitable for receiving telephone calls and in which said mobile station scans portions of a channel at a first rate;

wherein said mobile station is capable of operating in a second mode suitable for receiving pages only and in which said mobile station scans portions of the channel at a second rate;

wherein the first rate is higher than the second rate; and wherein said mobile station is capable of switching between the two modes at the option of the user thereof.

2. The system of claim 1, wherein the first rate is at least once every six seconds.

3. The system of claim 2, wherein the second rate is between once every six seconds and once every 3600 seconds.

4. The system of claim 1, wherein the first rate is once every 1.28 seconds and the second rate is once every 163.84 seconds.

5. The system of claim 1, wherein said mobile station is capable of receiving both telephone calls and pages when operating in the first mode.

6. A method of operating a mobile station in at least two modes, comprising the steps of:

setting the mode of operation of the mobile station to voice or page at the mobile station;

sending a message from the mobile station to a base station indicating the mode of the mobile station;

scanning portions of a channel for voice calls with a receiver in the mobile station at a first rate if in voice mode; and scanning portions of a channel for pages only with a receiver in the mobile station at a second rate if in page mode, wherein the first rate is higher than the second rate, and said mobile station is capable of operating either in the voice mode or the page mode at the option of an user of the mobile station thereof.

7. The method of claim 6, wherein the first rate is at least once every six seconds.

8. The method of claim 7, wherein the second rate is between once every six seconds and once every 3600 seconds.

9. The method of claim 6, wherein the first rate is once every 1.28 seconds and the second rate is once every 163.84 seconds.

10. The method of claim 6, wherein the mobile station is capable of receiving pages only when in page mode.

11. The method of claim 10, wherein the mobile station is capable of receiving telephone calls only when in voice mode.

12. The method of claim 10 wherein the mobile station is capable of receiving both telephone calls and pages when in voice mode.

13. A system for bimodal operation of a mobile station, comprising:

means for setting the mode of operation of the mobile station to voice or page at the mobile station;

means for sending a message from the mobile station to a base station indicating the mode of the mobile station;

means for scanning portions of a channel for voice calls with a receiver in the mobile station at a first rate if in voice mode; and means for scanning portions of a channel for pages only with a receiver in the mobile station at a second rate if in page mode, wherein the first rate is higher than the second rate, and said mobile station is capable of operating either in the voice mode or the page mode at the option of an user of the mobile station thereof.

* * * * *